(12) United States Patent
Mace

(10) Patent No.: US 9,201,816 B2
(45) Date of Patent: *Dec. 1, 2015

(54) DATA PROCESSING APPARATUS AND A METHOD FOR SETTING PRIORITY LEVELS FOR TRANSACTIONS

(71) Applicant: ARM LIMITED, Cambridge (GB)

(72) Inventor: Timothy Charles Mace, Suffolk (GB)

(73) Assignee: ARM Limited, Cambridge (GB)

( * ) Notice: Subject to any disclaimer, the term of this patent is extended or adjusted under 35 U.S.C. 154(b) by 192 days.

This patent is subject to a terminal disclaimer.

(21) Appl. No.: 13/966,711

(22) Filed: Aug. 14, 2013

(65) Prior Publication Data

US 2014/0047148 A1 Feb. 13, 2014

Related U.S. Application Data

(63) Continuation of application No. 12/923,350, filed on Sep. 15, 2010, now Pat. No. 8,549,199.

(30) Foreign Application Priority Data

Sep. 15, 2009 (GB) .................................. 0916200.9

(51) Int. Cl.
*G06F 13/14* (2006.01)
*G06F 13/16* (2006.01)
*G06F 13/362* (2006.01)

(52) U.S. Cl.
CPC .............. *G06F 13/14* (2013.01); *G06F 13/161* (2013.01); *G06F 13/362* (2013.01)

(58) Field of Classification Search
CPC ...... G06F 13/14; G06F 13/161; G06F 13/362
See application file for complete search history.

(56) References Cited

U.S. PATENT DOCUMENTS

| 5,805,840 A | 9/1998 | Dutton |
| 6,006,303 A | 12/1999 | Barnaby et al. |

(Continued)

FOREIGN PATENT DOCUMENTS

| EP | 1 852 783 | 11/2007 |
| JP | 5-89034 | 4/1993 |

(Continued)

OTHER PUBLICATIONS

Search Report for UK 0916200.9, dated Jan. 8, 2010.

(Continued)

*Primary Examiner* — Nimesh G Patel
(74) *Attorney, Agent, or Firm* — Nixon & Vanderhye P.C.

(57) ABSTRACT

A data processing apparatus and method for setting priority levels for transactions has a shared resource for processing transactions, and at least one master device for issuing the transactions to the shared resource. The master device provides a plurality of sources of the transactions, and each of the transactions has a priority level associated therewith. Arbitration circuitry applies an arbitration policy to select a transaction from amongst multiple transactions issued to the shared resource. Adaptive priority circuitry is associated with at least one of the sources and monitors throughput indication data for previously issued transactions from the associated source. For each new transaction from the associated source, the circuitry sets the priority level to one of a plurality of predetermined priority levels dependent on the throughput indication data. The adaptive priority circuitry sets the lowest priority level from amongst the plurality of predetermined priority levels.

32 Claims, 10 Drawing Sheets

(56) References Cited

U.S. PATENT DOCUMENTS

| | | |
|---|---|---|
| 2002/0002646 A1 | 1/2002 | Jeddeloh |
| 2004/0194095 A1 | 9/2004 | Lumb et al. |
| 2008/0077720 A1 | 3/2008 | Fanning |
| 2008/0263249 A1* | 10/2008 | Watabe et al. ............... 710/244 |
| 2010/0199010 A1 | 8/2010 | Goren et al. |

FOREIGN PATENT DOCUMENTS

| | | |
|---|---|---|
| JP | 11-191075 | 7/1999 |
| JP | 2006-350573 | 12/2006 |
| JP | 2008-532183 | 8/2008 |
| WO | WO 97/36243 | 10/1997 |
| WO | WO 2006/080371 | 8/2006 |
| WO | WO 2006/094142 | 9/2006 |

OTHER PUBLICATIONS

Weber et al., "A quality-of-service mechanism for interconnection networks in system-on-chips", 2005 *IEEE*, (No Date), pp. 1-6.

English translation of Japanese Office Action mailed Feb. 10, 2014 in JP 2010-205440.

* cited by examiner

DATA PROCESSING APPARATUS AND A METHOD FOR SETTING PRIORITY LEVELS FOR TRANSACTIONS

This application is a Continuation of application Ser. No. 12/923,350, filed Sep. 15, 2010 (now U.S. Pat. No. 8,549, 199), which claims priority to GB Application No. 0916200.9 filed Sep. 15, 2009. The entire contents of these applications are incorporated herein by reference.

FIELD OF THE INVENTION

The present invention relates to a data processing apparatus and method for setting priority levels for transactions.

BACKGROUND OF THE INVENTION

It is known in data processing systems to provide one or more resources for processing transactions issued by master devices within the system. An example of such resources would be one or more slave devices provided for performing operations in response to transactions issued to them by master devices within the system. The slave devices can take a variety of forms, and one example would be a memory controller used to handle read and write accesses in respect of an associated memory based on read and write transactions issued by various master devices within the data processing system.

Often the resources provided for processing transactions are shared between multiple sources of transactions. For example, in System-on-Chip (SoC) systems, it is known for multiple master devices to share the system resources. Wherever there are such shared resources, there will typically be one or more arbitration points along paths interconnecting the master devices and the shared resource, such arbitration points incorporating arbitration circuitry for applying an arbitration policy in order to arbitrate between multiple pending transactions issued to the same shared resource. Accordingly, the proportion of a shared system resource allocated to each master will be determined by the arbitration policy. The performance of the individual masters will in turn depend on the share of the system resources that they obtain.

There are a number of known types of arbitration policy. For example, a fixed arbitration policy may be applied, but with such an approach the share of the system resources that any particular master obtains depends on the activity of the other master devices, which will vary over time. Hence, such fixed arbitration policies will provide performance for any particular master that is dependent on the activity of other masters in the system. For a master device that has a specific task to perform in a particular period of time (for example a graphics processing unit that needs to process a frame's worth of graphics data within a frame period), a fixed level of system resource is required. However, with a fixed arbitration policy it is not possible to fix this level of system resource, so either the master is arranged to receive excess system resource to no overall system benefit, thus depriving other masters of this resource, or instead the master receives insufficient system resource and is unable to complete the specific task in the time allowed. In many systems, the latter scenario is not acceptable, and hence it is often the case that the arbitration policy is set to provide sufficient access to system resources under worst case conditions, which means that under normal operating conditions some master devices are receiving greater access to the system resources than they need, thereby depriving other masters of opportunities to improve their performance.

Some known arbitration policies, such as a weighted round-robin arbitration policy, partition the available bandwidth between the masters such that they are all guaranteed a minimum bandwidth under all operating conditions. However, such a policy must allocate a master a larger share of the shared system resource than would typically be necessary to achieve its minimum bandwidth, which will have the effect of increasing the latency of other masters in the system, with a corresponding reduction in the performance of those other masters.

The article "A Quality-of-Service Mechanism for Interconnection Networks in System-on-Chips" by W Weber et al, Sonics, Inc, 1530-1591/05 $20.00 © 2005 IEEE, describes an arbitration mechanism for arbitrating between several initiators seeking to access a single shared target via an interconnect. The described solution breaks arbitration for the target into two parts, namely arbitration in the core of the interconnect to deliver requests from different initiators to the target, and arbitration at the edge of the interconnect to enforce bandwidth allocations for different initiators. Threads (also referred to in the article as virtual channels) leading to a target can be assigned one of three quality-of-service levels, namely priority threads, bandwidth threads and best-effort threads. Priority threads are optimised for low-latency service, bandwidth threads receive throughput guarantee within fixed jitter bounds, and best-effort threads receive service if and when bandwidth is left over by the other threads. Priority threads and bandwidth threads have a certain absolute target bandwidth allocation associated with them. As long as priority threads request service at a rate lower than their allocation, they receive absolute priority. Similarly, as long as bandwidth threads request service at a rate lower than their allocation, they are serviced ahead of best-effort threads. However, when either priority threads or bandwidth threads request service at a rate greater than their allocation, they are demoted to become best-effort threads.

Hence, by such a mechanism, the higher priority threads are demoted if they start to request service at a rate greater than their bandwidth allocation. However, when employing such an approach, the quality-of-service levels assigned to particular threads will, by virtue of the scheme used, be higher than absolutely necessary to enable those threads to achieve their desired tasks, thereby reducing the performance potential of other masters within the system, such as central processing units (CPUs).

Accordingly, it would be desirable to provide an improved technique for arbitrating access to a shared resource by transactions issued from a plurality of sources within a data processing apparatus.

SUMMARY OF THE INVENTION

Viewed from a first aspect, the present invention provides a data processing apparatus comprising: a shared resource for processing transactions; at least one master device for issuing said transactions to said shared resource, the at least one master device providing a plurality of sources of said transactions, and each of said transactions having a priority level associated therewith; arbitration circuitry for applying an arbitration policy to select a transaction from amongst multiple transactions issued to said shared resource, the arbitration policy using the priority level associated with each of said multiple transactions when performing the selection; and adaptive priority circuitry associated with at least one of said plurality of sources, the adaptive priority circuitry being arranged to monitor throughput indication data for previously issued transactions from the associated source, and for each new transaction from the associated source to set the priority level to one of a plurality of predetermined priority levels dependent on said throughput indication data, so as to set the lowest priority level from amongst said plurality of predetermined priority levels that will enable a specified target throughput to be achieved.

In accordance with the present invention, adaptive priority circuitry is associated with at least one source and receives throughput indication data for previously issued transactions from that source. Based on that throughput indication data available at the time a new transaction is to be issued from the associated source, and having regard to a specified target throughput to be achieved, the adaptive priority circuitry is then arranged to set the priority level for that new transaction. In particular, the adaptive priority circuitry is able to set the priority level to one of a plurality of predetermined priority levels, and for each new transaction will set the associated priority level for that transaction to the lowest priority level from amongst the plurality of predetermined priority levels that will enable the specified target throughput to be achieved.

The adaptive priority circuitry of the present invention hence operates using a form of feedback loop, since the priority level set for a new transaction is dependent on the throughput indication data observed for previously issued transactions, and the priority level set for the new transaction will in turn affect the throughput later observed by the adaptive priority circuitry, which in turn will then affect the priority level set for a subsequent new transaction.

By using this feedback mechanism to control the priority assigned to each new transaction from a source, the adaptive priority circuitry is able to find the lowest priority level necessary to achieve the specified target throughput, independent of the activity of other sources of transactions within the data processing apparatus. Since the transactions issued by the source associated with the adaptive priority circuitry are set at the lowest priority level needed to meet the specified target throughput of that source, this allows the performance of other sources within the system to be improved, since the source associated with the adaptive priority circuitry takes only the minimum share of the shared resource that it requires in order to meet its specified target throughput.

The throughput indication data can take a variety of forms. However, in one embodiment, the throughput indication data comprises latency indication data indicative of a latency associated with the previously issued transactions, and the specified target throughput is a specified target latency. Often, a source of transactions will have a bandwidth to latency characteristic such that, for a range of latency values, as the latency value decreases, the bandwidth, and hence throughput, of the slave device increases, and similarly as the latency increases, the bandwidth and hence throughput decreases. Having regard to the desired throughput for the source, it is possible with reference to the bandwidth to latency characteristic to determine a target latency. The adaptive priority circuitry can then vary the priority level for each new transaction dependent on how the observed latency indication data for previously issued transactions compares with the specified target latency.

In particular, if the observed latency for the previously issued transactions is on average higher than the specified target latency, the adaptive priority circuitry can increase the priority level set for a new transaction. This will tend to bring the latency observed by that source down, which over time will lead to a lowering of the average latency observed in the latency indication data received by the adaptive priority circuitry. Similarly, if the observed latency for previous transactions is on average less than the specified target latency, the adaptive priority circuitry will lower the priority level for each new transaction, which will have the effect over time of increasing the latency observed by the source, and hence increasing the average latency observed in the latency indication data received by the adaptive priority circuitry.

By such an approach, the specified target latency ensures that the adaptive priority circuitry sets the priority levels for transactions at the lowest priority level necessary to ensure a minimum processing rate for the associated source, independent of the variations in other traffic in the system.

The adaptive priority circuitry can take a variety of forms. However, in one embodiment, the adaptive priority circuitry comprises: active transaction count circuitry for determining from the throughput indication data an indication of the number of transactions in progress; and accumulator circuitry for maintaining a priority level control value, the accumulator circuitry increasing the priority level control value dependent on the indication of the number of transactions in progress. Hence, in such embodiments, a priority level control value is maintained by accumulator circuitry, and takes a value which is dependent on the throughput indication data accumulated for all previously issued transactions since the accumulator circuitry was initialised.

In one embodiment, to stop the priority level control value increasing unchecked over time, a mechanism is also put in place to periodically reduce the priority level control value. In particular, in one embodiment, the adaptive priority circuitry is arranged to detect from the throughput indication data when a transaction in progress has reached a predetermined point, and each time said predetermined point is detected, the accumulator circuitry is arranged to decrease the priority level control value. The predetermined point can take a variety of forms, but in one embodiment the predetermined point is a transaction end point. The transaction end point can be configured in a variety of ways, but in one embodiment will be, for a read transaction, the point at which the first read data of that read transaction is returned to the source, or for a write transaction will be the time when the last write data item is output from the source.

The amount by which the accumulator circuitry is decreased upon detection of each predetermined point can be varied dependent on implementation. However, in one embodiment, the adaptive priority circuitry is provided with a target throughput indication indicative of said specified target throughput, and each time said predetermined point is detected, the accumulator circuitry is arranged to decrease the priority level control value by an amount dependent on said target throughput indication. By such an approach, when a steady state is reached whereby the observed throughput indication data for previously issued transactions matches the specified target throughput, the amount by which the priority level control value is increased between each predetermined point being detected will then be cancelled out by the amount of the decrease applied to the priority level control value upon detection of each predetermined point. However, when the throughput indication data indicates a throughput which is starting to deviate from the target throughput, this will cause the priority level control value to increase over time, or decrease over time, dependent on the direction of the deviation.

The frequency with which the accumulator circuitry increases the priority level control value dependent on the indication of the number of transactions in progress may vary dependent on the implementation. However, in one embodiment, for each clock cycle whilst the active transaction count circuitry indicates that there is at least one transaction in progress, the accumulator circuitry is arranged to increase the priority level control value.

In one particular embodiment, the target throughput indication provides an indication of a target average latency per transaction, and each clock cycle whilst the active transaction count circuitry indicates that there is at least one transaction in progress, the accumulator circuitry is arranged to increase the priority level control value by an amount dependent on the number of transactions that are in progress as indicated by the active transaction count circuitry. Further, each time said predetermined point is detected, the accumulator circuitry is arranged to decrease the priority level control value by an amount dependent on said target average latency per transaction indication. Such an approach has the effect of targeting a constant latency.

In an alternative embodiment, the target throughput indication provides an indication of a target average latency between occurrences of said predetermined point, and each clock cycle whilst the active transaction count circuitry indicates that there is at least one transaction in progress, the accumulator circuitry is arranged to increase the priority level control value by a fixed integer amount. Further, each time said predetermined point is detected, the accumulator circuitry is arranged to decrease the priority level control value by an amount dependent on said target average latency between occurrences of said predetermined point. Such an approach has the effect of targeting a constant processing rate instead of a constant latency.

In embodiments where the throughput indication data comprises latency indication data, for each of said previously issued transactions the adaptive priority circuitry receives, as said latency indication data, first and second timing indications. The first and second timing indications can take a variety of forms, but in one embodiment said first timing indication is a transaction start indication, and said second timing indication is a transaction end indication. Whilst the conditions triggering the first and second timing indications may be fixed, in one embodiment they can be programmable.

In one embodiment, the active transaction count circuitry uses the transaction start indication and the transaction end indication to maintain a record of the number of transactions that are in progress. The use of the transaction start and transaction end indications provides a simple and effective mechanism for keeping a record of the number of transactions that are in progress.

In one embodiment, the adaptive priority circuitry further comprises priority value determination circuitry which, for each new transaction, sets the priority level for that transaction dependent on the priority level control value currently maintained by the accumulator circuitry. In such embodiments, the priority level control value does not directly provide the new priority level to be used for a new transaction, but instead the priority value determination circuitry applies one or more processing operations on the priority level control value in order to produce the priority level.

For example, in one embodiment, the priority value determination circuitry includes loop gain circuitry for controlling the extent to which changes in the priority level control value cause changes to the priority level set for each new transaction. In one particular embodiment, the loop gain circuitry multiplies the priority level control value by a loop gain value which will typically be set to a high enough value to ensure a reasonable responsiveness to changes in the priority level control value, whilst being low enough to ensure stable operation.

In one embodiment, the priority value determination logic will also include saturation circuitry to ensure that the range of values output by the loop gain circuitry are constrained to within a range equatable with the available plurality of predetermined priority levels.

In one embodiment, if over time the monitored throughput indication data indicates that the throughput is exceeding the specified target throughput, the operation of the accumulator circuitry causes the priority level control value to be decremented below a value associated with the lowest priority level from amongst said plurality of predetermined priority levels, in order to cause the priority level control value to capture a measure of excess throughput observed by the associated source, and the priority value determination circuitry includes saturation circuitry to ensure in such instances that the priority level is set to the lowest priority level amongst said plurality of predetermined priority levels. Hence, in such embodiments, whilst the saturation circuitry ensures that the priority level will not drop below the lowest priority level within the plurality of predetermined priority levels, the priority level control value maintained by the accumulator is allowed to drop further. Such an approach can be beneficial, since it allows the accumulator to in effect store the level of excess bandwidth supplied to the associated source. When subsequently there is less bandwidth available, the accumulator will then take some time for the priority level control value to rise to a level where it will then start to cause the priority level assigned to a new transaction to increase, thereby in effect repaying the excess bandwidth previously given to it, and enabling better performance from other transaction sources within the system.

The source with which the adaptive priority circuitry is associated can take a variety of forms. However, in one embodiment, the associated source performs discrete blocks of processing, each block of processing needing to complete within a specified time, and the adaptive priority circuitry is provided with a target throughput indication indicative of said specified target throughput, the target throughput indication identifying an average target throughput per transaction which if achieved will enable each block of processing to be performed within the specified time. There are various examples of sources which will perform discrete blocks of processing, for example a graphics processor, a video processor, an audio processor, etc. As another example, a direct memory access (DMA) engine may also perform such discrete blocks of processing.

In one embodiment, the operation of the accumulator circuitry can be allowed to run from one block of processing to another, such that the starting value of the priority level control value when a new block of processing begins will be given by the final priority level control value obtained when the preceding block of processing finished. However, in an alternative embodiment, the accumulator circuitry may be arranged to be reset between each discrete block of processing. Such an approach would typically be taken at least in embodiments where the priority level control value maintained by the accumulator circuitry is allowed to capture a measure of excess throughput observed by the associated source, since typically the ability to repay excess bandwidth cannot extend between discrete blocks of processing.

There are a number of ways in which the reset of the accumulator circuitry can take place. For example, in one embodiment, the accumulator circuitry may receive a reset signal generated by the associated source. For example, considering an embodiment where the associated source is a graphics processing unit, the graphics processing unit may be arranged to generate an interrupt signal on completion of each frame, and that interrupt signal may be used to generate a reset signal to the accumulator circuitry. In an alternative embodiment, software executing within the data processing apparatus, for example executing on a CPU within the data processing apparatus, may be arranged to generate such a reset signal.

In one embodiment, the at least one master device comprises a plurality of master devices, each master device providing at least one source of said transactions. In one such embodiment, at least one of said plurality of master devices is a batch processing device performing batch processing operations, and the adaptive priority circuitry is associated with said batch processing device.

The batch processing device may take a variety of forms, for example a graphics processing unit, a video processing unit, an audio processing unit, etc. In one embodiment, a further master device within the apparatus is a central processing unit, and the central processing unit does not have the adaptive priority circuitry associated therewith. Instead, it will often be the case that the central processing unit will have a fixed priority level associated therewith, that priority level being higher than the priority level normally associated with the batch processing device. However, through use of the adaptive priority circuitry in association with the batch processing device, the priority level associated with transactions issued by the batch processing device can be increased as and when needed in order to ensure that the specified target throughput is achieved. However, because of the way the adaptive priority circuitry operates, such an increase in the priority level of the batch processing device is only undertaken when absolutely necessary, and accordingly such an approach maximises the performance of other master devices in the system such as the central processing unit.

In one embodiment, the plurality of sources are formed by a plurality of processing threads executing on a single master device, and the adaptive priority circuitry is associated with at least one of said processing threads. In one embodiment, such a master device may be a graphics processing unit, and the plurality of processing threads may comprise at least a vertex processing thread and a pixel processing thread.

In one embodiment, the plurality of sources may be formed by different types of transactions executing on the at least one master device, an example of such different types of transactions being write transactions and read transactions.

In one embodiment, the target throughput indication is programmable, thereby allowing the target throughput indication to be varied, for example dependent on the activities of the associated source. As a particular example, where the associated source is performing graphics processing operations, the amount of processing required from frame to frame may vary, and hence if the graphics processor starts to process frames requiring significantly more processing operations than previous frames, the target throughput can be increased with the aim of acquiring more bandwidth for the graphics processing unit whilst those computationally intensive frames are being processed.

The shared resource can take a variety of forms, but in one embodiment the shared resource may take the form of a memory controller.

The arbitration circuitry may be provided at a variety of places within the data processing apparatus. For example, often the master devices will be coupled with one or more shared resources via an interconnect structure, and often multiple points of arbitration will be provided within the interconnect structure. Accordingly, such arbitration circuitry may be replicated at each of the multiple points of arbitration within the interconnect so as to allow priority level based arbitration to be performed at those multiple points.

Alternatively, or in addition, the shared resource may itself include a point of arbitration, and accordingly the arbitration circuitry may also be provided within the shared resource. For example, considering an embodiment where the shared resource is a memory controller, the memory controller often includes a queue in which pending read and write accesses are stored. A priority level based arbitration mechanism may be employed in association with that queue in order to select the next transaction for forwarding to memory, taking into account the priority level associated with each of the multiple transactions stored in the queue.

Indeed, in some embodiments, there will be instances of the arbitration circuitry within the interconnect and one or more instances of the arbitration circuitry within one or more shared resources, and in such embodiments the same arbitration policy can be applied both within the interconnect and within those shared resources.

Viewed from a second aspect, the present invention provides adaptive priority circuitry for use in association with a source of transactions in a data processing apparatus in accordance with the first aspect of the present invention, the adaptive priority circuitry being arranged to monitor throughput indication data for previously issued transactions from the associated source, and for each new transaction from the associated source to set an associated priority level for that transaction to one of a plurality of predetermined priority levels dependent on said throughput indication data, so as to set the lowest priority level from amongst said plurality of predetermined priority levels that will enable a specified target throughput to be achieved.

Viewed from a third aspect, the present invention provides a method of setting priority levels for transactions within a data processing apparatus, the data processing apparatus comprising a shared resource for processing transactions, at least one master device for issuing said transactions to said shared resource, the at least one master device providing a plurality of sources of said transactions, and each of said transactions having a priority level associated therewith, and arbitration circuitry for applying an arbitration policy to select a transaction from amongst multiple transactions issued to said shared resource, the arbitration policy using the priority level associated with each of said multiple transactions when performing the selection, the method comprising, for at least one of said plurality of sources, the steps of: monitoring throughput indication data for previously issued transactions from that source; and for each new transaction from that source, setting the priority level to one of a plurality of predetermined priority levels dependent on said throughput indication data, so as to set the lowest priority level from amongst said plurality of predetermined priority levels that will enable a specified target throughput to be achieved.

Viewed from a fourth aspect, the present invention provides a data processing apparatus comprising: shared resource means for processing transactions; at least one master means for issuing said transactions to said shared resource means, the at least one master means for providing a plurality of sources of said transactions, and each of said transactions having a priority level associated therewith; arbitration means for applying an arbitration policy to select a transaction from amongst multiple transactions issued to said shared resource means, the arbitration policy using the priority level associated with each of said multiple transactions when performing the selection; and adaptive priority means associated with at least one of said plurality of sources, the adaptive priority means for monitoring throughput indication data for previously issued transactions from the associated source, and for each new transaction from the associated source, the adaptive priority means for setting the priority level to one of a plurality of predetermined priority levels dependent on said throughput indication data, so as to set the lowest priority level from amongst said plurality of predetermined priority levels that will enable a specified target throughput to be achieved.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
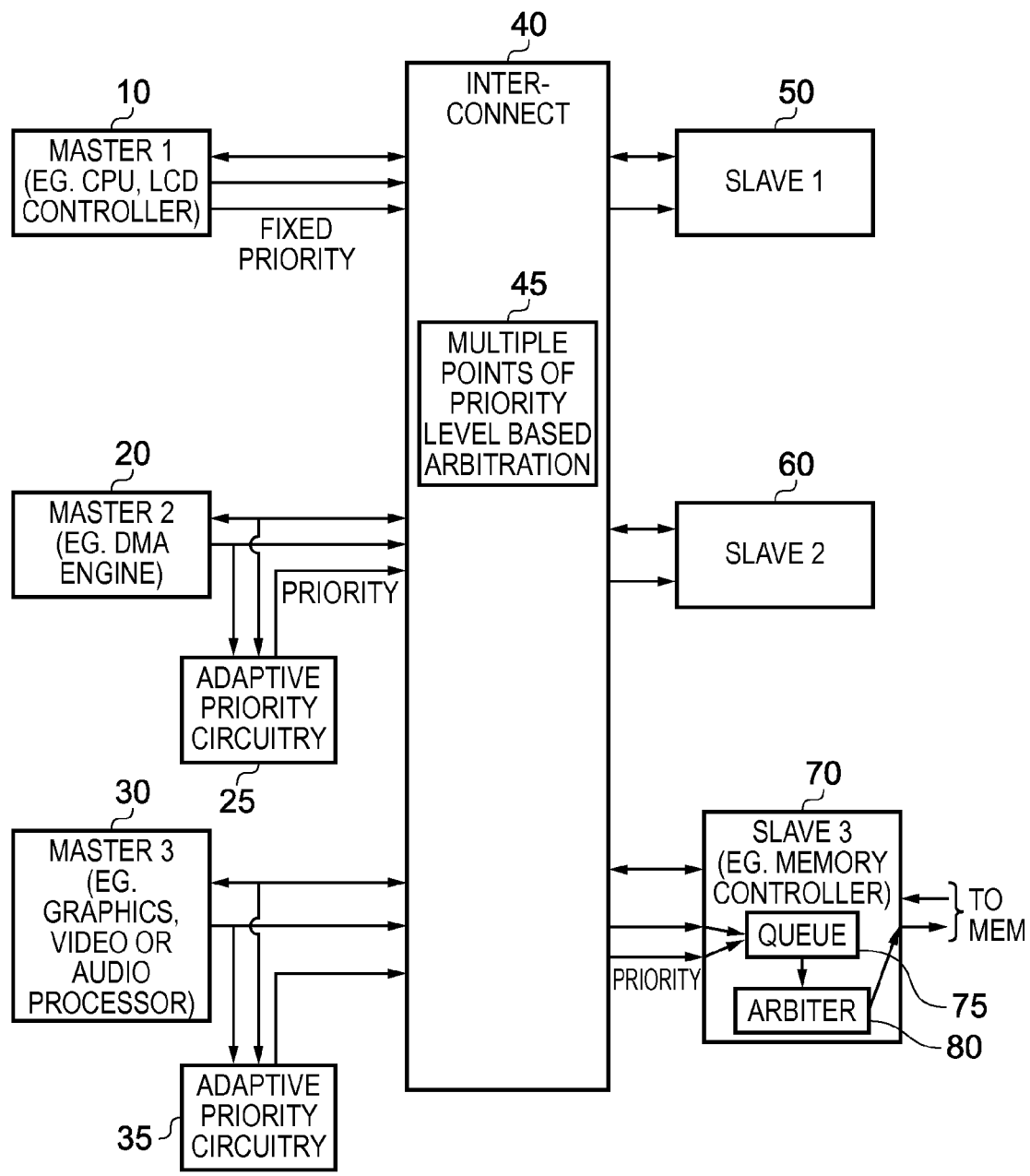
FIG. 1 is a block diagram of a data processing apparatus in accordance with one embodiment.

FIG. 1 is a block diagram of a data processing apparatus in accordance with one embodiment. In the illustrated example, a plurality of master devices 10, 20, 30 are coupled to a plurality of slave devices 50, 60, 70 via an interconnect structure 40. When transactions are issued by the various masters, priority levels are associated with those transactions, with those priority levels being used when performing arbitration between multiple asserted transactions at various points within the apparatus. For example, the interconnect 40 will typically include multiple points of arbitration 45, and at each point an arbitration policy can be applied to perform a priority level based arbitration. Further, one or more of the slave devices may themselves include a point of arbitration. For example, if slave device 3 70 were to take the form of a memory controller, such a memory controller will typically include a queue 75 into which pending transactions can be placed, each transaction in the queue being arranged to keep a record of its associated priority level. An arbiter 80 can then be used to determine from the transaction entries in the queue which transaction should next be issued to memory, such an arbiter applying a priority level based arbitration in order to determine that next transaction to be issued to memory. For such priority based arbitration to be performed within the slave device, the priority level information needs to be propagated on from the interconnect 40 to the slave device 70. However, for any slave devices that do not perform any internal arbitration, the priority level information need not be propagated on to those slave devices, and accordingly in the example of FIG. 1 both the slave devices 50 and 60 do not require the priority level information to be propagated on from the interconnect.

In accordance with embodiments of the present invention, one or more of the master devices may be provided with adaptive priority circuitry for determining the priority level to be associated with each transaction issued by that master. Hence, in the example illustrated in FIG. 1, both the master devices 20 and 30 have associated adaptive priority circuitry 25 and 35, respectively, for setting the priority level of each transaction issued by those masters. The adaptive priority circuitry of embodiments of the present invention can be used in association with a variety of different master devices, but in one embodiment is used with master devices that perform batch operations. An example would be a graphics processor, video processor or audio processor, where discrete blocks of processing are performed, with each block of processing needing to complete within a specified time. For example, considering a graphics processor, a frame's worth of graphics data needs to be processed within each frame period. In the example of FIG. 1, it is assumed that the master 30 is a graphics processor, a video processor or an audio processor.

As another example, the adaptive priority circuitry may be used with a Direct Memory Access (DMA) engine 20 which may need to transfer blocks of data within allocated time periods.

However, the adaptive priority circuitry will not typically be associated with every master in the apparatus, and hence for example there may be other masters that employ other schemes for allocating priorities to their transactions. An example would be a central processing unit (CPU), which will typically have a fixed priority associated therewith. Another example would be an LCD controller, which performs stream processing in order to produce output to a display. As with a CPU, an LCD controller will typically be attributed a fixed priority, and often both the CPU and the LCD controller will have a priority that is higher than the default priority associated with batch processing devices such as a graphics processor, DMA engine, etc.

However, as will be apparent from the further discussions of the adaptive priority circuitry of embodiments of the present invention, the adaptive priority circuitry employs a feedback mechanism to control the priority level assigned to each new transaction from its associated source in order to target a specified throughput for that source, and through this feedback mechanism finds the lowest priority level necessary to achieve the throughput objectives independent of the activity of other sources within the system. Where necessary, this will mean that the priority level of master devices such as the master 20 and master 30 can be raised to a level where they are equal to or greater than the priority associated with the master 10, but this state will only be maintained for the minimum amount of time necessary to enable the throughput objectives of that master device 20, 30 to be achieved.

Such an approach ensures that master devices such as the master 20 or master 30 take only the minimum share of a shared resource (such as the slave devices 50, 60, 70) that they require in order to meet their specified target throughput, and this allows the performance of other transaction sources such as the master 10 to be improved.

Further, such an approach enables all of the points of arbitration within the system to apply the same arbitration policy. Hence, each point of arbitration within the interconnect can apply a priority level based arbitration, and similarly local points of arbitration within the relevant slave devices, such as the slave 70, can apply the same priority level based arbitration policy as their default arbitration mechanism. Hence, the arbiter 80 that determines which transaction to retrieve from the queue 75 can use the same arbitration policy as used within the interconnect. It will be appreciated, however, that memory controllers can also employ additional mechanisms to increase their throughput, taking into account the structure and capability of the memory with which they interact, for example to maximise the usage of different chips within the memory, etc. Such optimisations can be layered on top of the default arbitration policy that is based on the priority levels of the transactions.

Figure 2:
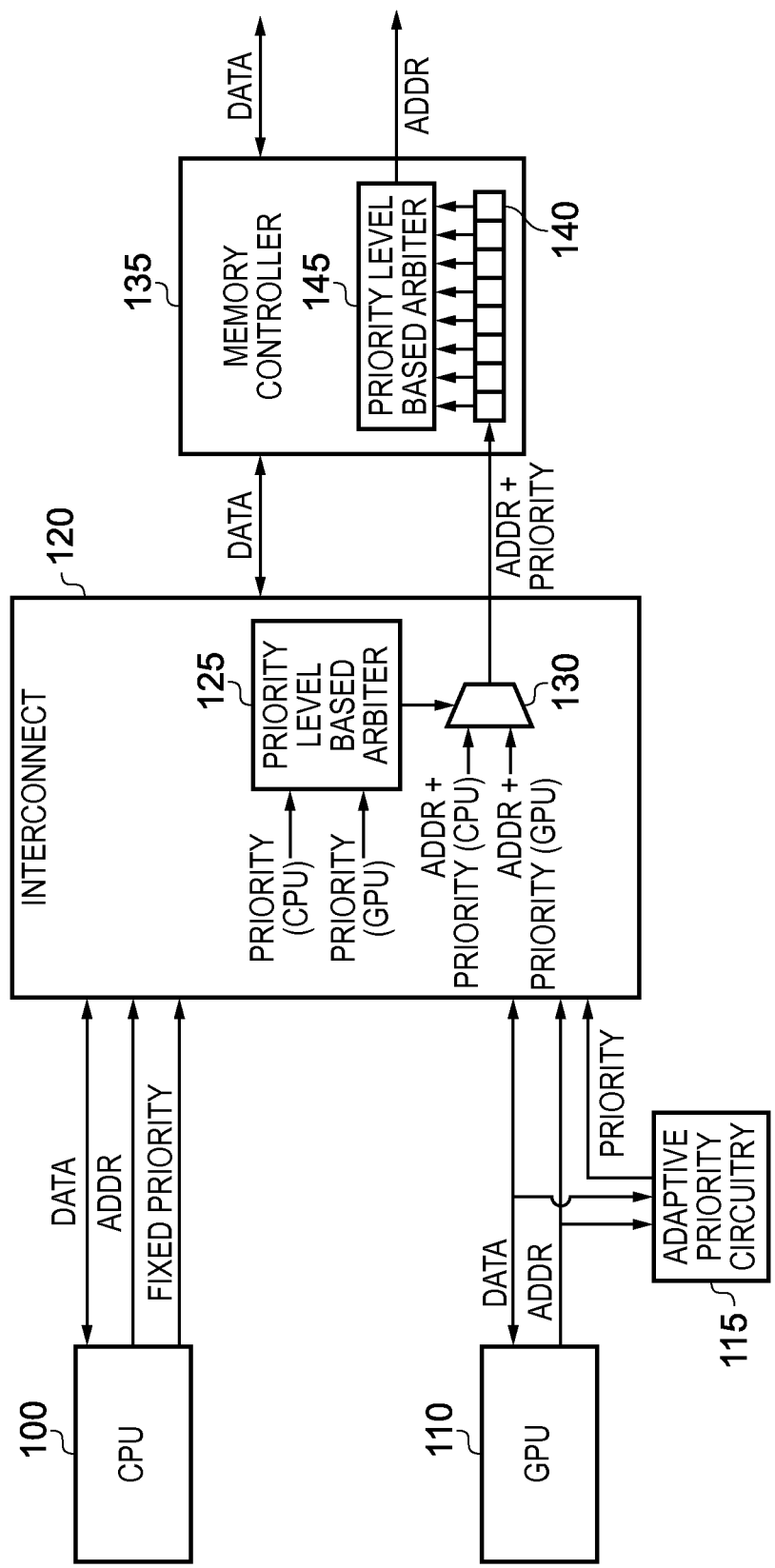
FIG. 2 is a block diagram of a data processing apparatus in accordance with one embodiment.

FIG. 2 illustrates a particular example implementation where a CPU 100 and graphics processing unit (GPU) 110 share access to a memory controller 135, and are connected to that memory controller via an interconnect 120. Each transaction issued by the CPU or the GPU involves the transfer of an address from the CPU or GPU to the target slave device, in this example the memory controller 135, along with the transfer of one or more blocks of data between the CPU or GPU and the memory controller, the direction of the data transfer being dependent on whether the transaction is a write transaction or a read transaction. In the schematic illustration of FIG. 2, a uni-directional address path is shown, along with a bi-directional data path. It will however be appreciated that the actual structure of the address paths and data paths will vary dependent on implementation, and in particular the transaction protocol employed by the interconnect. For example, where a split transaction protocol is used, such as the AXI (Advanced eXtensible Interface) protocol developed by ARM Limited, Cambridge, United Kingdom, there may be multiple separate address paths and multiple separate data paths, in particular separate paths being provided for read transactions and for write transactions.

As shown in the example of FIG. 2, the CPU 100 uses a fixed priority for its transactions, and an indication of that priority level is issued with each address initiating a transaction. However, for the GPU 110, a fixed priority is not used, and instead the adaptive priority circuitry 115 is used to assert a priority level for each transaction issued. In particular, as will be discussed in more detail later, the adaptive priority circuitry 115 monitors the address and data paths in order to obtain throughput indication data for previously issued transactions from the GPU 110, and on the basis of that throughput indication data determines an appropriate priority level to assert for each new transaction issued from the GPU 110.

Within the interconnect 120, there will typically be multiple points of arbitration, and each point of arbitration will apply an arbitration policy dependent on the priority level set by the CPU and GPU. One arbitration point is shown schematically in FIG. 2, namely the final point of arbitration used to produce address and priority signals forwarded on to the memory controller 135. As shown in FIG. 2, a multiplexer 130 receives the address and priority information for each transaction from the CPU and the GPU, and is controlled by the output of a priority level based arbiter 125, which receives as its input the associated priority information from the CPU and the GPU for the relevant transactions. Typically, the CPU's priority will be higher than the GPU's, and hence in the presence of simultaneous asserted transactions from both the CPU and the GPU, the priority level based arbiter 125 will select the CPU as the transaction to be forwarded on to the memory controller. However, as and when required in order to meet the throughput objectives of the GPU, the adaptive priority circuitry 115 may elevate the priority of the GPU's transactions to a point where it becomes higher priority than the CPU, at which point the priority level based arbiter 125 will output the GPU transaction ahead of the CPU transaction in the event that the CPU and GPU simultaneously assert transactions to the memory controller 135.

Each transaction forwarded to the memory controller 135 from the interconnect 120 is placed in a queue 140, and each time the memory controller issues a transaction to the memory, the priority level based arbiter 145 analyses the current contents of the queue 140 in order to determine which pending transaction in the queue has the highest priority. The transaction having the highest priority is then forwarded to the memory, and in particular the address of the transaction is forwarded to the memory in order to cause the relevant read or write operation to take place. The handling of the data occurs in a standard manner.

Figure 3:
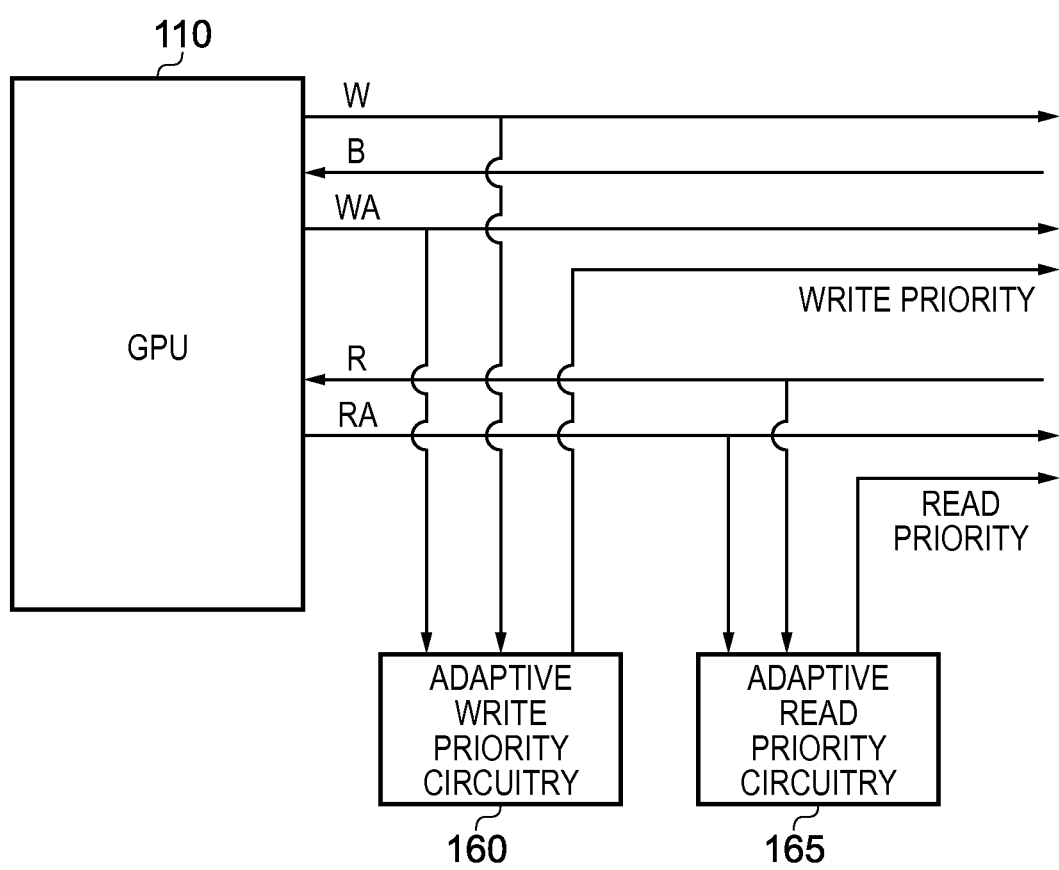
FIG. 3 is a block diagram illustrating how multiple adaptive priority circuits may be used in association with a single master device in accordance with one embodiment.

In one embodiment, a single master device may provide a plurality of different sources of transactions, and separate adaptive priority circuitry may be provided for each such source. For example, FIG. 3 illustrates an embodiment where separate adaptive priority circuitry is provided for the read and write transactions issued by the GPU 110. In this embodiment, a split transaction protocol is used, with the communication between the GPU 110 and the interconnect comprising five separate channels of communication, namely a write address (WA) channel for carrying address transfers of write transactions, a write data (W) channel for carrying data transfers of write transactions, a write response (B) channel for returning transaction status information to the master at the end of a write transaction (indicating for example whether the transaction completed successfully, or whether an error occurred, etc), a read address (RA) channel for carrying address transfers of read transactions, and a read data (R) channel for carrying data transfers of read transactions.

As shown in FIG. 3, an adaptive write priority circuitry 160 can be arranged to produce a write priority level for each new write transaction, that write priority level being passed along with the write address for use at any of the points of arbitration along the path to the target slave device. The throughput indication data observed by the adaptive write priority circuitry for previously issued write transactions can be taken from the write address and write data channels as is illustrated in FIG. 3. In particular, in one embodiment the throughput indication data can take the form of latency indication data providing a transaction start indication and a transaction end indication. The transaction start and end indications can be determined in a variety of ways, but in one particular embodiment the issuance of the write address from the GPU 110 is treated as the start of the transaction, and the issuance of the final write data value from the GPU 110 is treated as the end indication. In an alternative embodiment, the transaction end indication could be derived from the signals passed over the write response channel, the write response data for a particular transaction typically occurring some time after the transfer of the final write data value on the write data channel.

As also shown in FIG. 3, the adaptive read priority circuitry 165 can take its throughput indication data for previously issued read transactions from the read address and read data channels. In the embodiment where the throughput indication data provides transaction start and transaction end information, the transaction start information can be determined from the read address issued for each transaction, and the transaction end information is in one embodiment determined by the occurrence of the first read data value returned to the master device for each transaction.

Whilst in FIG. 3 the use of separate adaptive priority circuits for the write transactions and the read transactions is illustrated with reference to a split transaction protocol having separate channels for the write transaction information and for the read transaction information, there is no requirement for such separate channels to be provided. Indeed, separate adaptive priority circuits can be provided for read transactions and write transactions in any system, and if that system employs shared address buses and/or shared data buses for read and write transactions, then each adaptive priority circuit will use the associated control signals passed in association with the information on those address and data buses in order to identify the presence of information relating to a read transaction or a write transaction, allowing the adaptive write priority circuitry to operate in association with write transactions and the adaptive read priority circuitry to operate in association with read transactions.

Figure 4:
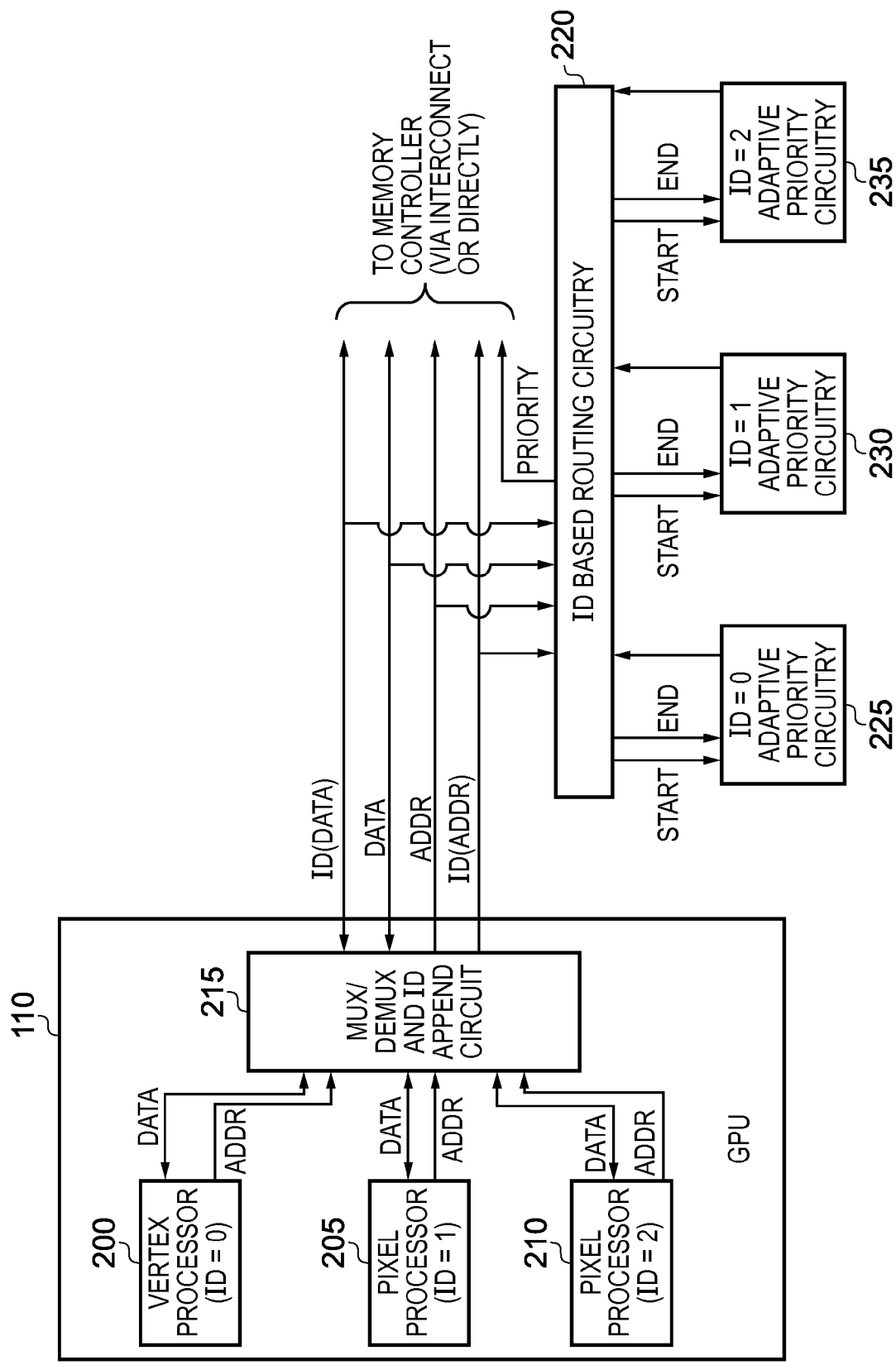
FIG. 4 is a block diagram illustrating how multiple adaptive priority circuits may be used in association with a single master device in accordance with an alternative embodiment.

In one embodiment, a single master device may provide a plurality of sources of transactions in the form of a plurality of processing threads executing on that master device, and the adaptive priority circuitry may be provided separately for each of those processing threads. FIG. 4 illustrates one such example where the GPU 110 incorporates a vertex processor 200 for performing vertex processing operations, and a number of pixel processors 205, 210 for performing pixel processing operations. Each of these various processing threads will have an ID value associated therewith, with circuitry 215 being provided for multiplexing signals issued from the various processing threads on to the output path, and for demultiplexing signals received by the GPU for forwarding to the appropriate processing thread. For outgoing traffic, the circuitry 215 adds the appropriate ID value to the data prior to it being issued over the output path, and for incoming data will use the associated ID value to determine which of the processing threads is the destination for the incoming data. For the purposes of illustration, a uni-directional address path is shown along with an associated ID signal path, and a bidirectional data path is shown, along with an association bidirectional ID path, but it will be appreciated that each of these paths may be formed by one or more separate channels of communication dependent on embodiment, and in particular dependent on the transaction protocol used.

As shown in FIG. 4, separate adaptive priority circuits 225, 230, 235 are provided for each of the separate processing threads 200, 205, 210, and ID based routing circuitry 220 is used to interface between those separate adaptive priority circuits and the buses carrying the address and data information. In particular, by using the ID value accompanying each address or data item, the ID based routing circuitry 220 can determine which adaptive priority circuit should receive the throughput indication data derived from address and data items. In one embodiment the ID based routing circuitry 220 can notify the relevant adaptive priority circuitry of all address and data items relating to the associated ID, or instead may internally perform processing required to detect the start and end indications for each transaction, and merely forward those start and end indications to the relevant adaptive priority circuitry. For each new transaction, the relevant adaptive priority circuitry will then generate a priority value which will be routed via the ID based routing circuitry 220 for issuance as a side band signal with the relevant address signal.

The GPU 110 may in this embodiment be connected to a slave device including at least one point of arbitration (such as would be provided within a memory controller), or more typically may be connected to such a slave device via an interconnect structure incorporating one or more points of arbitration. In the latter scenario, as discussed earlier with reference to FIG. 1, in addition to the interconnect having one or more points of arbitration, the slave device may also independently include a point of arbitration.

Figure 5:
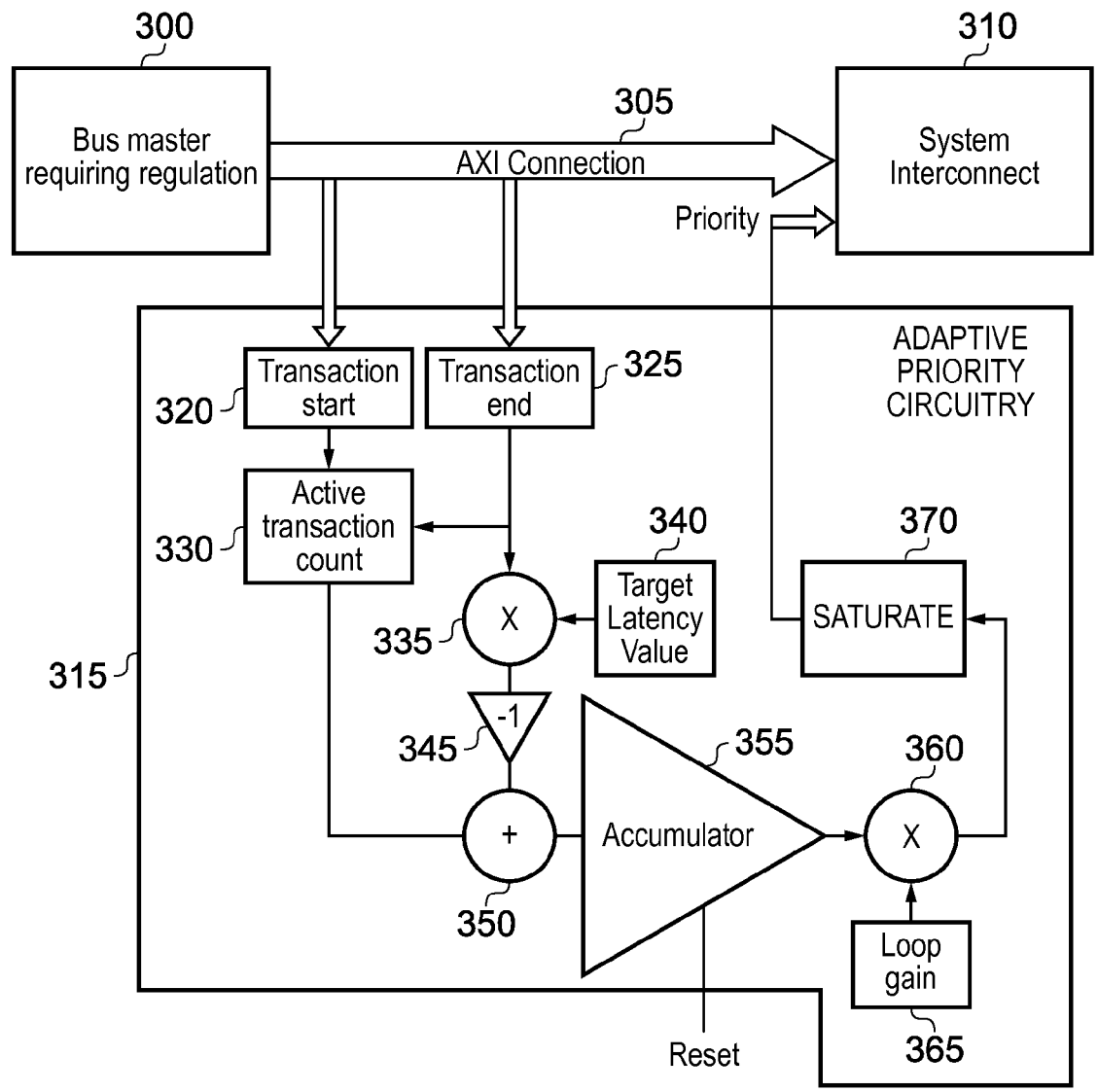
FIG. 5 is a diagram illustrating the components provided within the adaptive priority circuitry in accordance with one embodiment.

FIG. 5 is a diagram schematically illustrating the components provided within the adaptive priority circuitry in accordance with one embodiment of the present invention. In this example, a bus master requiring regulation 300 initiates transactions over a connection path 305 to a system interconnect 310, in this example it being assumed that the connection path 305 employs ARM's AXI protocol. However, as discussed earlier, the techniques of embodiments of the present invention can be employed in association with any communication protocol and hence there is no requirement for the AXI protocol to be used.

The adaptive priority circuitry 315 is arranged to snoop the activities occurring over the connection path 305 in order to obtain throughput indication data for previously issued transactions, and to detect when a new transaction is starting and generate a priority level for that new transaction.

In particular, the transaction start circuitry 320 detects a start of a transaction as a request from the master 300, whilst the transaction end circuitry 325 detects the completion of a transaction. In one embodiment, for a read transaction the transaction end circuitry 325 detects the transaction end when the first read data is returned to the master 300, whilst for a write transaction the transaction end circuitry 325 detects the transaction end when the last write data item is transferred from the bus master 300.

The active transaction count component 330 uses these two events to calculate the number of transactions that are in progress from the bus master 300. On every clock cycle, this indication of the number of outstanding transactions is routed via the adder 350 into the accumulator 355, where a number equal to the number of outstanding transactions is added to its current accumulator value.

Further, a target latency value 340 identifying a target average latency per transaction is stored within the target latency value storage 340. Each time a transaction ends, the multiplier 335 and inverter 345 along with the adder 350 causes the target latency value to be subtracted from the accumulated value.

The output from the accumulator 355 is multiplied at the multiplier 360 with a programmed loop gain value stored within the loop gain storage 365 in order to select the loop gain, and the resulting value is passed through the saturation block 370 where values out of a programmed range are saturated to the limits of the range. The output of this block is then used to drive the priority level for subsequent transactions from the master.

It will be appreciated that the time between each transaction start and transaction end indication observed by the circuits 320 and 325 identifies a latency for each transaction. If the average observed latency for the previously issued transactions is less than the target average latency value in the storage 340, the accumulator value will decrease, which will decrease the priority level set for subsequent transactions, which in turn will increase the average latency then observed. In contrast, if the average observed latency is greater than the target average latency value in the storage 340, then the accumulator value will increase, thereby increasing the priority level associated with subsequent transactions, which in turn will decrease the average latency then observed.

The loop gain term stored in the loop gain storage 365 is chosen to ensure that the loop is stable in the presence of the latency within the system. This can be determined through standard control theory techniques and sets an upper limit on the loop gain. The lower limit is determined by the duration of the activity that the master is performing. For example, a GPU will operate on a frame of graphics data, so the time constant of the loop should be smaller than the frame period.

The saturation limits employed by the saturate block 370 may be set as follows. If there is insufficient bandwidth from the target slave device (e.g. a memory controller) at any point, the designer of the system must decide the order in which to starve master devices of bandwidth. The highest priority level value is determined by this ordering. Further, if there is excess bandwidth from the target slave device, the accumulator value will drop below the lowest priority level. The saturation limit should be set at the lowest priority level.

However, in one embodiment, it is beneficial to allow the accumulator to drop further since by allowing such a drop, the value of the accumulator will in effect store the level of excess bandwidth supplied to the master. When subsequently the system has less bandwidth available, the accumulator value will take some time before returning to a point where the priority level will then move above the minimum priority level, and during that period the bus master will, in effect, repay the excess bandwidth that it previously received, thereby enabling better performance from other master devices within the system. However, this ability to repay excess bandwidth cannot typically extend between frames for a GPU, and so a reset function is in one embodiment provided in association with the accumulator 355, to allow the accumulator to be reset between frames.

The reset signal issued to the accumulator can be provided in a variety of ways. In one embodiment, the accumulator circuitry 355 may receive a reset signal generated by the associated bus master 300. For example, considering an embodiment where the associated bus master is a graphics processing unit, the graphics processing unit may be arranged to generate an interrupt signal on completion of each frame, and that interrupt signal may be used to generate the reset signal to the accumulator circuitry 355. In an alternative embodiment, software executing within another master of the data processing apparatus, for example executing on a CPU, may be arranged to generate such a reset signal.

In one embodiment, the conditions triggering the transaction start and transaction end indications are programmable. Similarly, the target latency value stored within the storage 340 may be programmable, for example to enable the target latency to be varied having regard to the activities of the associated bus master 300.

In an alternative embodiment, instead of adding to the accumulator value each clock cycle a value equal to the number of outstanding transactions, the adaptive priority circuitry may be arranged to add a fixed integer value each clock cycle, for example a logic one value. In such embodiments, the target latency value stored within the storage 340 can be arranged to provide an indication of a target average latency between occurrences of the transaction end points, rather than an indication of a target average latency between start and end points for a transaction. In such an embodiment, the adaptive priority circuitry will have the effect of targeting a constant processing rate instead of a constant latency.

Figure 6:
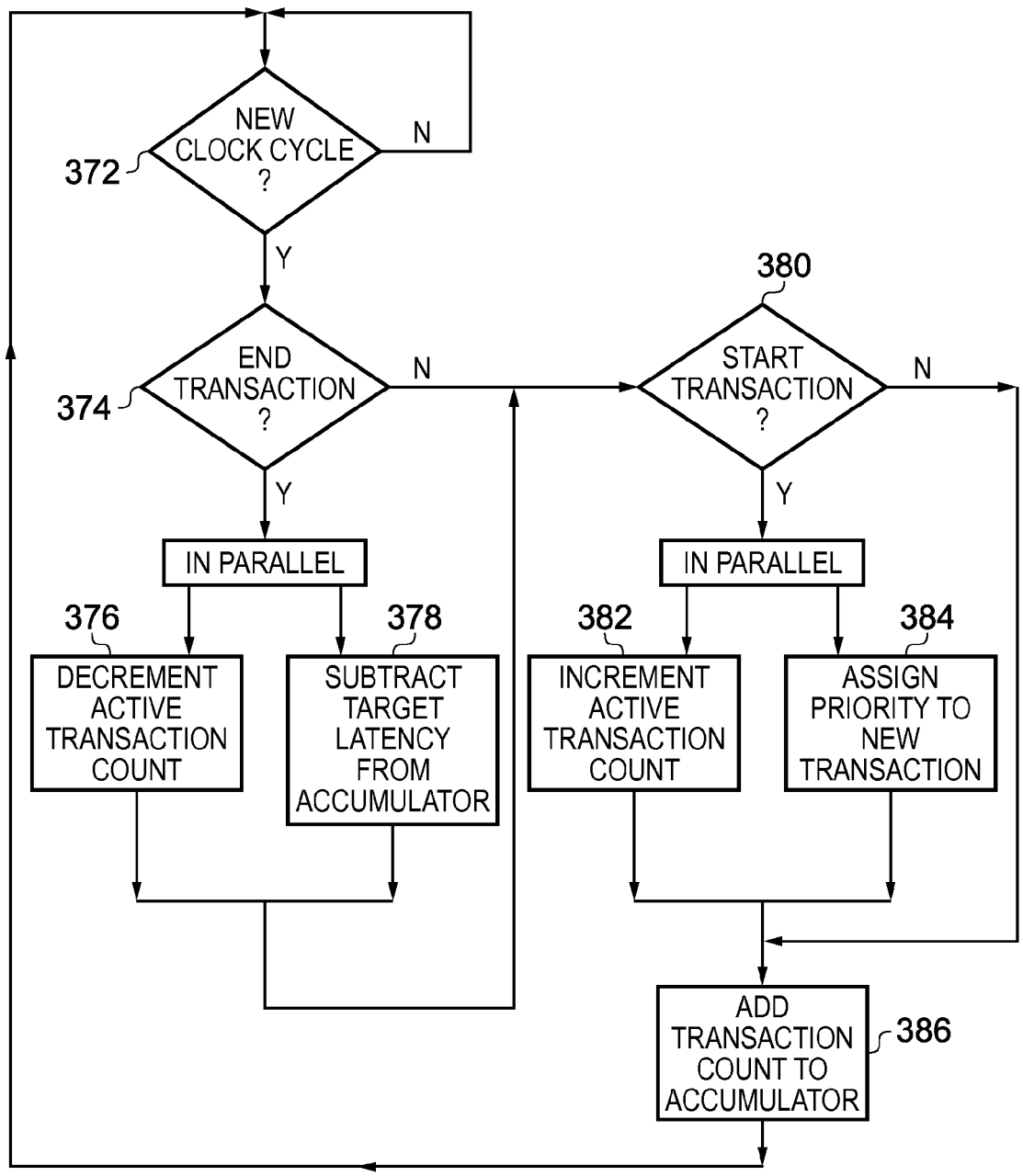
FIG. 6 is a flow diagram illustrating the operation of the adaptive priority circuitry of FIG. 5 in accordance with one embodiment.

FIG. 6 is a flow diagram illustrating the operation of the adaptive priority circuitry 315 of FIG. 5. At step 372, it is determined whether a new clock cycle has started, and when a new clock cycle has started, the process proceeds to step 374, where it is determined whether an end transaction indication has been observed for this clock cycle. If so, then steps 376 and 378 are performed in parallel. In particular, at step 376, the active transaction count maintained by the component 330 is decremented, typically the value being decremented by one. At step 378, the target latency value within the storage 340 is subtracted from the accumulator value maintained by the accumulator 355.

Following steps 376 and 378, the process proceeds to step 380, or proceeds directly to step 380 from step 374 in the event that an end transaction indication is not observed in the current clock cycle. At step 380, it is determined whether a start transaction has been observed in the current clock cycle, and if so steps 382 and 384 are performed in parallel. In particular, at step 382, the active transaction count value is incremented, typically the value being incremented by one. At step 384, a priority level is assigned to the new transaction based on the current accumulate value, as discussed earlier with reference to FIG. 5 such a priority level value being obtained after performing loop gain modification and saturation operations in respect of the output from the accumulator.

Following steps 382 and 384, the process proceeds to step 386, or proceeds directly to step 386 from step 380 in the event that a start transaction indication has not been observed in the current clock cycle. At step 386, the current transaction count value is added to the accumulator in order to increase the accumulator value by a number equal to the number of outstanding transactions. Following step 386, the process returns to step 372 and awaits the start of the next clock cycle.

Figure 7A:
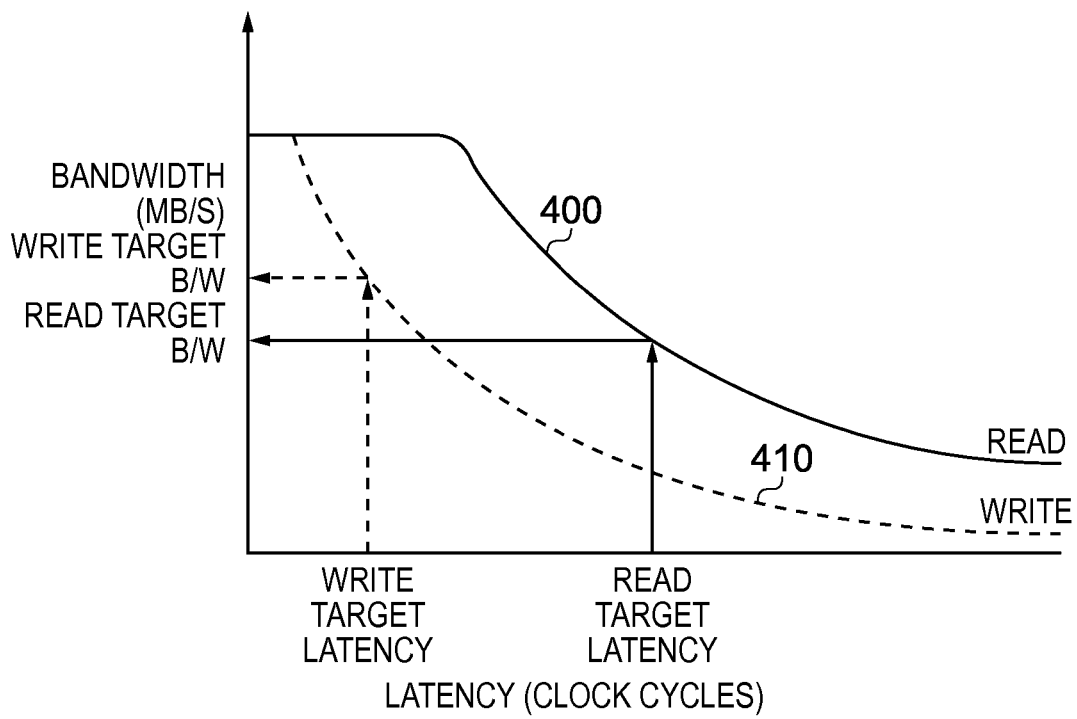
FIG. 7A is a graph illustrating a bandwidth to latency characteristic that may be observed by a master device such as a graphics processing unit.

FIG. 7A is a graph illustrating the bandwidth to latency characteristic observed by a batch processing device such as a GPU. As shown schematically in FIG. 7A, as the latency starts to increase from zero, the bandwidth of the GPU is initially unaffected. This is because the ability of the GPU to handle multiple outstanding transactions means that the GPU is initially relatively insensitive to the latency change. However, at some point the increase in latency begins to have an effect on the bandwidth, and the bandwidth to latency characteristic starts to follow the curve 400. Whilst in the area of the curve 400, it can be seen that an increase in latency brings about a reduction in bandwidth, and similarly a decrease in latency brings about an increase in bandwidth. It can hence be seen that if a desired target bandwidth for the device can be determined, then this can be equated with a corresponding target latency.

As shown by the dotted line 410, the bandwidth to latency characteristic for read and write operations may vary, and in particular whilst the curve 400 may be appropriate to read transactions, a separate curve 410 may be relevant to write transactions. Further, a device may typically have a different target bandwidth for read and write operations, which in turn will also give rise to different read and write target latencies. This is one reason why it can be beneficial in certain embodiments to provide separate adaptive priority circuits for write transactions and for read transactions.

Figure 7B:
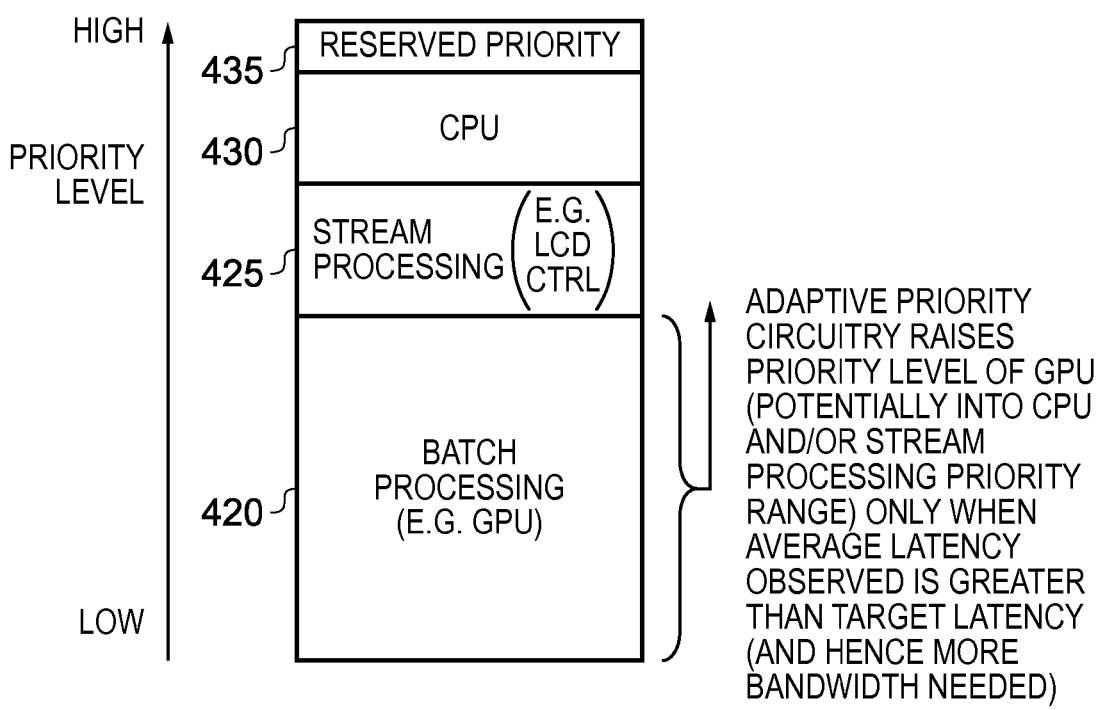
FIG. 7B illustrates how priority levels may be allocated to different types of masters, and illustrates how the adaptive priority circuitry of embodiments may be used to raise the priority level of a batch processing device such as a graphics processing unit when necessary.

FIG. 7B schematically illustrates priority levels that can be associated with different types of devices. At the low priority end, a range of priority levels 420 may be associated with batch processing devices, of which a GPU would be an example. One or more higher priority levels 425 may then be associated with stream processing devices, for example an LCD controller, since the operations of a stream processing device such as an LCD controller are more time critical than the operations of a batch processing device. One or more higher priority levels 430 may then be associated with CPU devices, of which there may be multiple within a system. Finally, a reserved priority level 435 may be provided, and a stream processing device may occasionally be allowed to take on that reserved priority level in order to allow sufficient bandwidth to be obtained to enable the stream processing device to produce output data at the required rate.

In accordance with embodiments of the present invention one or more of the batch processing devices may be provided with associated adaptive priority circuitry which will operate to raise the priority level of the associated batch processing device only when the average latency observed is greater than the target latency, and hence more bandwidth is needed. This may cause the batch processing device's priority to be raised into the CPU and/or stream processing device priority range for periods of time. However, the operation of the adaptive priority circuitry causes the lowest priority level necessary to achieve the specified latency target to be used, independent of the activities of the other sources of transactions, and accordingly this allows the performance of the other sources within the system to be improved, since the source associated with the adaptive priority circuitry takes only the minimum share of the shared resource(s) that it requires in order to meet its specified latency target.

Figure 8:
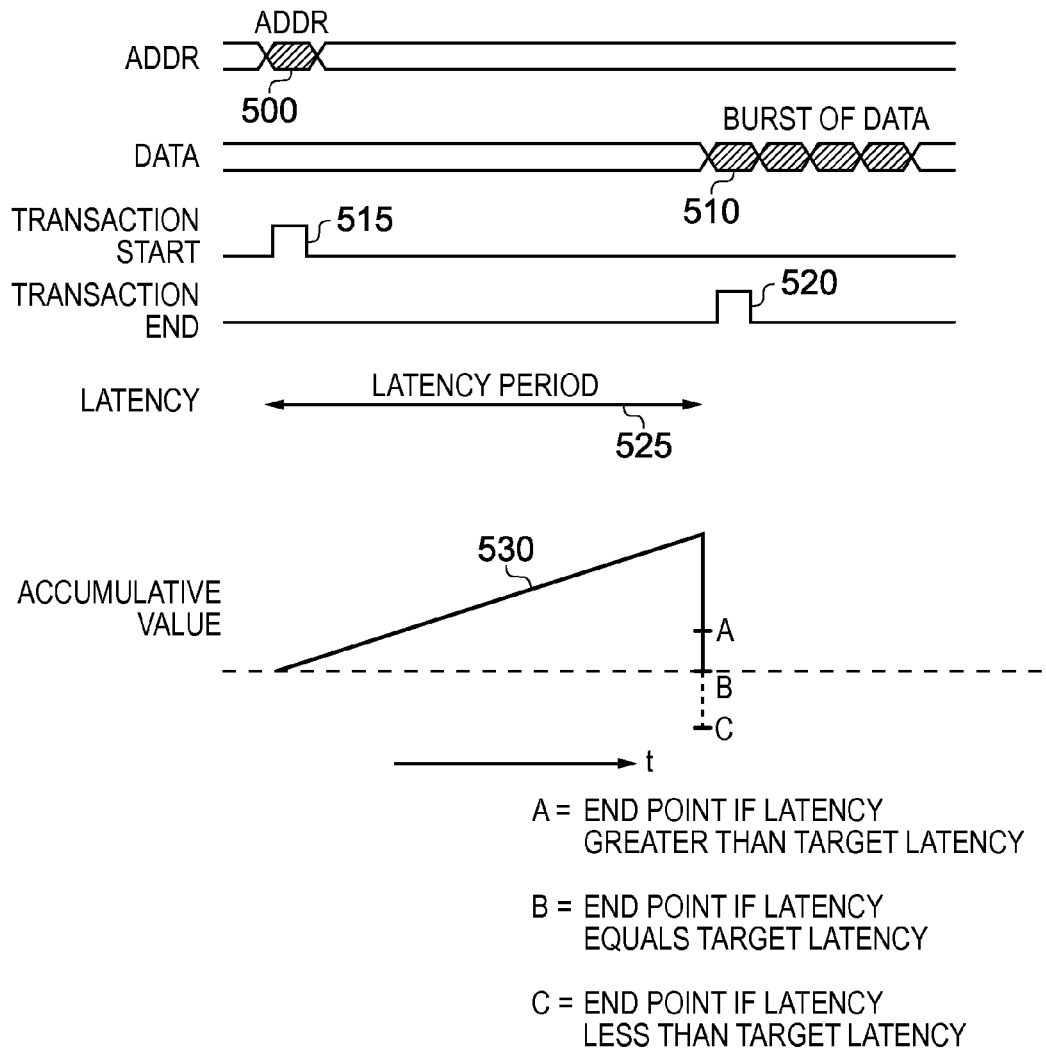
FIG. 8 is a diagram illustrating how the accumulate value maintained by the accumulator of the adaptive priority circuitry of FIG. 5 may rise and fall during operation of the adaptive priority circuitry.

FIG. 8 is a diagram schematically illustrating how the accumulate value maintained by the accumulator 355 rises and falls between each transaction start and transaction end for a read transaction. On occurrence of an address 500 signalling the start of a transaction, a transaction start indication 515 is generated by the transaction start circuitry 320 causing the active transaction count value to be incremented. Each clock cycle, the value of the active transaction count is added to the accumulator value, which causes the accumulator value to ramp up along the line 530. When, several clock cycles later, the first read data value 510 is observed, this causes the transaction end indication 520 to be generated by the transaction end circuitry 325. The period of time that has elapsed between the transaction start indication 515 and the transaction end indication 520 identifies the latency period 525 for that transaction. At the time the transaction end indication is generated, this causes a value equal to the target average latency value stored in the storage 340 to be subtracted from the accumulator value causing the accumulate value to drop. The end point after the drop will be at the point B if the latency period 525 equals the target latency. However, if the latency period 525 is greater than the target latency, then the end point will be above point B, schematically illustrated by point A in FIG. 8. Similarly, if the latency period 525 is less than the target latency, then the end point will be below point B, schematically illustrated by point C in FIG. 8.

Accordingly, it will be appreciated that if the average latency observed for the previously issued transactions is greater than the target average latency, the value of the accumulator value will increase over time, thereby causing an increase in the priority level associated with subsequent transactions. Similarly, if the average latency observed for the previously issued transactions is less than the target latency, then the accumulator value will decrease over time, causing the priority level associated with subsequent transactions to be decreased.

It will be appreciated that FIG. 8 illustrates a relatively simple example, and that in practice multiple pending transactions can be in progress at any point in time, and hence the addresses for multiple transactions can be issued before the data associated with one of the earlier transactions is observed, meaning that between the transaction start point 515 and the transaction end point 520, one or more further transaction start points and transaction end points may be observed. However, the same basic phenomenon is observed, in that the accumulate value will increase over time if the average latency period observed for the transactions is greater than the target latency, and the accumulator value will decrease over time if the average observed latency is less than the target latency.

Figure 9A:
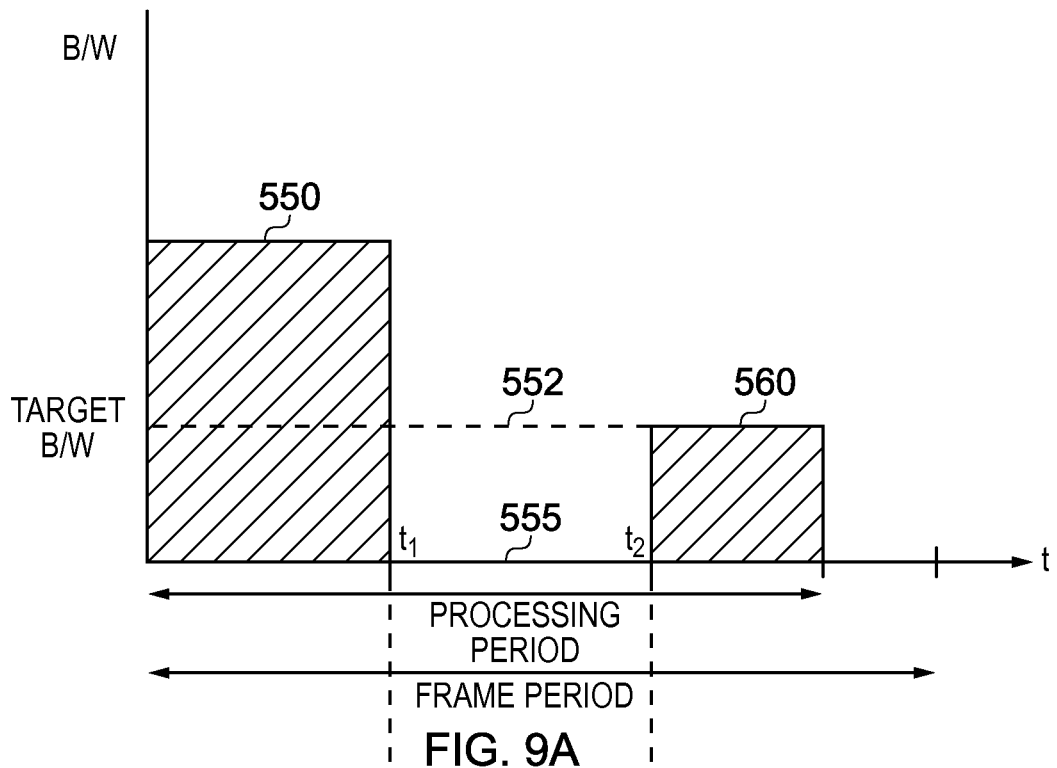
FIGS. 9A and 9B illustrate how the bandwidth available to a master may vary during processing of a batch operation when using the adaptive priority circuitry of embodiments.
Figure 9B:
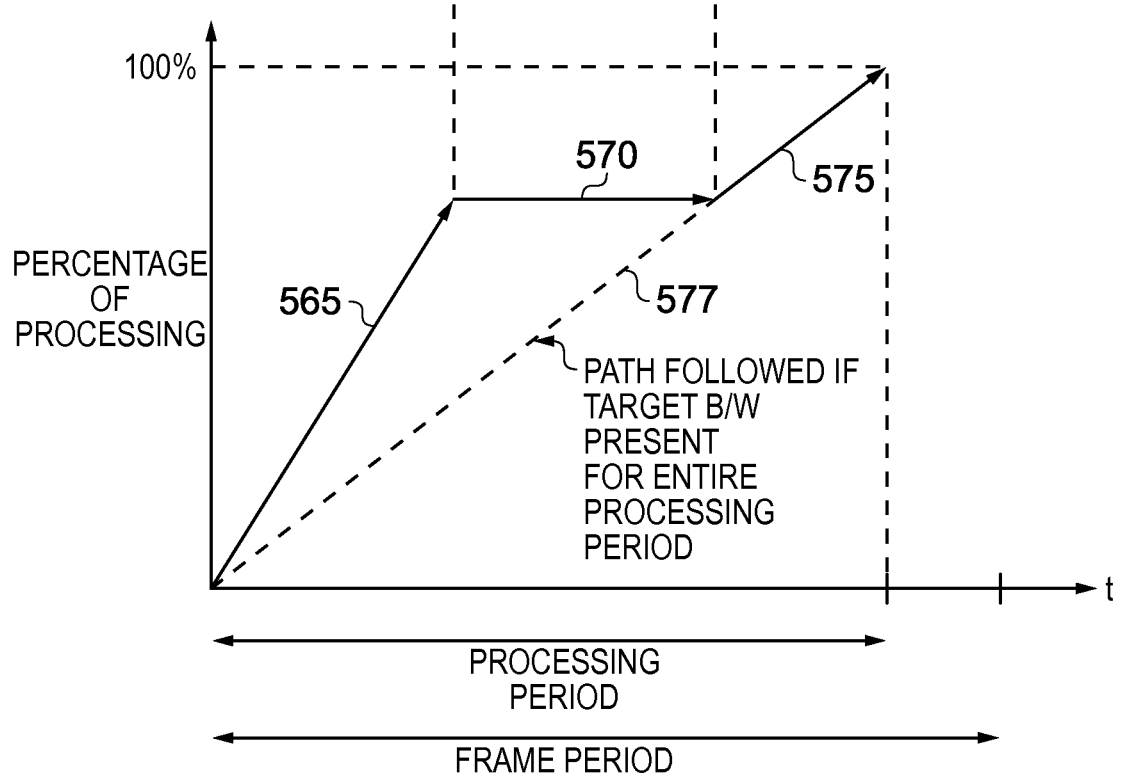

FIGS. 9A and 9B schematically illustrate the bandwidth observed by a GPU within a particular processing period, for one particular example scenario. In particular, FIG. 9A shows how bandwidth varies with time, whilst FIG. 9B shows how the percentage of processing increases with time. By the end of the processing period, a 100% of the required processing must be completed. Typically, the processing period will be less than the frame period. In particular, having regards to the variation in the amount of processing required for each frame, a target bandwidth will have been set so that only a small proportion of frames fail to complete their processing within the frame period. Hence, for nearly all of the frames, the processing will have been completed a little time ahead of the end of the frame period.

As shown by the dotted line 552, if the GPU observes a constant bandwidth equal to its target bandwidth, it will have completed the task by the end of the processing period. As shown in FIG. 9B, in such a scenario, the percentage of processing will follow the dotted line 577 steadily increasing from 0% to 100% by the end of the processing period.

However, in the example illustrated in FIGS. 9A and 9B, it is assumed that in the early part of the frame period, the GPU receives significantly more than its target bandwidth, and in particular receives the bandwidth shown by the line 550. This means that in the early part of the frame period, the percentage of processing follows the line 565, and accordingly gets significantly ahead of where the processing might be expected to be during that early part of the frame period. At time $t_1$ the GPU suddenly stops receiving any bandwidth and accordingly cannot perform any further processing. The bandwidth hence drops to zero and follows the line 555, whilst the percentage of processing follows the line 570. During this time, the accumulate value is allowed to go negative to thereby store an indication of the level of excess bandwidth supplied to the master during the early part of the frame period. When bandwidth then becomes available to the GPU, it takes some time before the GPU will begin to raise the priority level associated with new transactions from the GPU.

At time $t_2$ the GPU begins to obtain its target bandwidth, and the bandwidth follows the line 560 for the rest of the processing period. Accordingly, the percentage of processing starts to increase and follows the line 575, such that 100% of the processing has been performed by the end of the processing period.

It should be noted that if the accumulate value had not been allowed to go negative in order to store an indication of the level of excess bandwidth supplied to the master, the priority level output for new transactions would have been raised earlier, and the GPU would have started to obtain bandwidth earlier, resulting in the percentage of processing reaching 100% before the end of the shown processing period. Whilst this would be a perfectly acceptable way of operating the adaptive priority circuitry, by allowing the amount of excess bandwidth to be stored through the mechanism which allows the accumulator value to go negative, it can be ensured that the period of time taken to perform 100% of the processing is the same as would have been the case had the GPU received its target bandwidth for the whole of the period. This therefore enables the performance of the other masters in the system to be maximised by avoiding the GPU taking more bandwidth than is absolutely necessary.

Figure 10A:
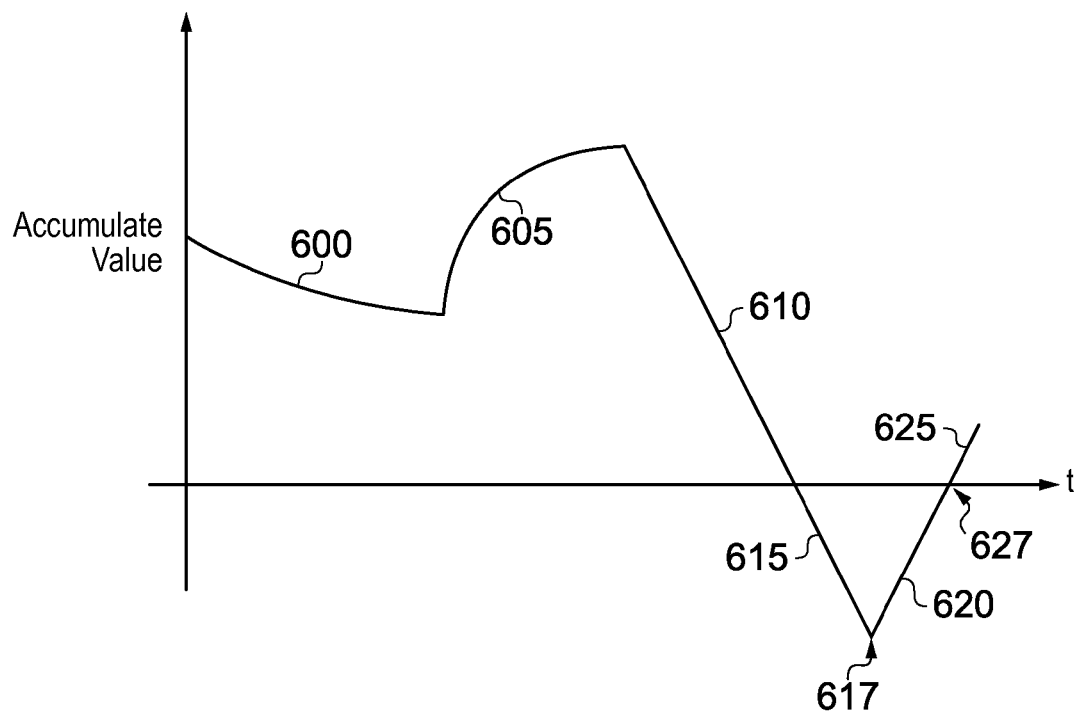
FIGS. 10A and 10B illustrate how the priority level set by the adaptive priority circuitry may track with the accumulate value, whilst allowing the accumulate value to become negative for periods of time, in accordance with one embodiment.
Figure 10B:
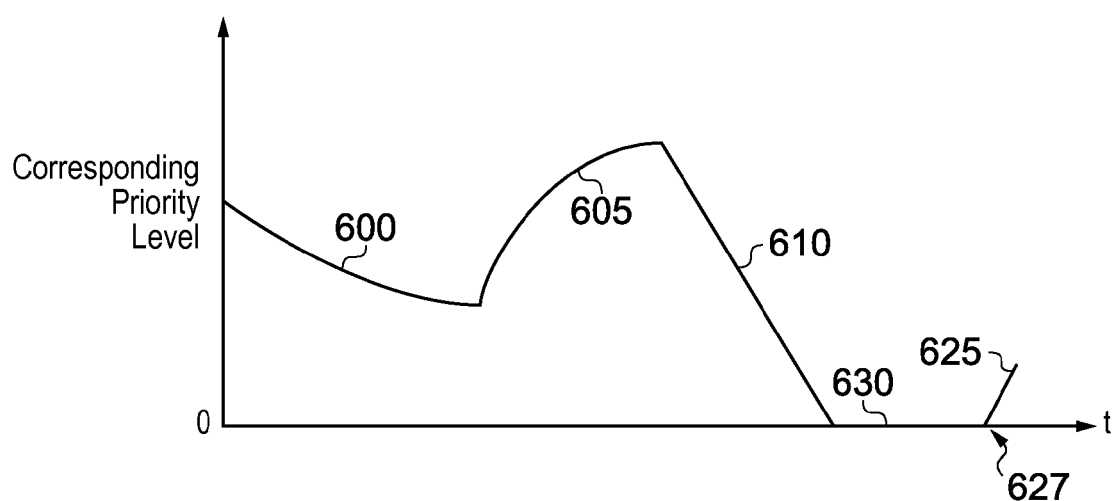

FIGS. 10A and 10B illustrate how the priority level generally tracks with the accumulate value, except in instances where the accumulate value goes negative in order to store a level of excess bandwidth supplied. During period 600, the accumulate value drops since the observed latency is less than the target latency, and this hence gives rise to a reduction in the priority level. At some point, the observed latency starts to become greater than the target latency, and this causes a rise in the accumulate value along the path 605, with a corresponding rise in the priority level. Thereafter, at some point, the observed latency becomes less than the target latency and the accumulate value starts to drop along the path 610. Initially, the priority level tracks along a similar path, but once the accumulate value goes negative at point 615, the priority level is maintained at priority level zero for the period 630. When the accumulate value starts to increase again at point 617, and follows the line 620, the priority level does not immediately start to rise above the zero level, but instead stays at the priority level zero value until point 627 is reached, whereafter it starts to increase along the path 625.

In an alternative embodiment, the accumulator could have been prevented from dropping along the line 615, and in that event the priority level would have begun to be increased again as soon as the accumulate value began to rise at the time point 617. However, as discussed earlier, by allowing the accumulate value to go negative, this in effect stores up an indication of the level of excess bandwidth supplied to the master, and allows the natural processing period to be retained, rather than causing the batch task to be finished earlier than needed.

From the above described embodiments, it will be appreciated that such embodiments provide adaptive priority circuitry which uses a feedback mechanism to control the priority level assigned to each new transaction from an associated source in order to target a specified throughput for that source, and through this mechanism finds the lowest priority necessary to achieve the throughput objectives independent of the activity of other sources within the system. Such a mechanism hence provides regulated access to system resources to provide performance that is independent of the activity of other masters, allowing optimal allocation of system resources to maximise the performance of the masters in the system and the utilisation of the slaves, for example the memory controller.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
    a shared resource for processing transactions;
    at least one master device configured to issue said transactions to said shared resource, the at least one master device providing a plurality of sources of said transactions, and each of said transactions having a priority level associated therewith;
    arbitration circuitry configured to apply an arbitration policy to select a transaction from amongst multiple transactions issued to said shared resource, the arbitration policy using the priority level associated with each of said multiple transactions when performing the selection; and
    adaptive priority circuitry associated with at least one of said plurality of sources, the adaptive priority circuitry configured to monitor throughput indication data for previously issued transactions from the associated source, and, for each new transaction from the associated source, to set the priority level to one of a plurality of predetermined priority levels dependent on said throughput indication data, so as to set the lowest priority level from amongst said plurality of predetermined priority levels that will enable a specified target throughput to be achieved,
    wherein the adaptive priority circuitry comprises:
        active transaction count circuitry configured to determine from the throughput indication data an indication of the number of transactions in progress; and
        accumulator circuitry configured to maintain a priority level control value, the accumulator circuitry increasing the priority level control value dependent on the indication of the number of transactions in progress,
    wherein the adaptive priority circuitry is configured to detect from the throughput indication data when a transaction in progress has reached a predetermined point, and responsive thereto the accumulator circuitry is arranged to decrease the priority level control value.

2. A data processing apparatus as claimed in claim 1, wherein the accumulator circuitry is configured to decrease the priority level control value each time said predetermined point is detected.

3. A data processing apparatus as claimed in claim 1, wherein the adaptive priority circuitry is provided with a target throughput indication indicative of said specified target throughput, and each time said predetermined point is detected, the accumulator circuitry is configured to decrease the priority level control value by an amount dependent on said target throughput indication.

4. A data processing apparatus as claimed in claim 1, wherein said predetermined point is a transaction end point.

5. A data processing apparatus as claimed in claim 1, wherein, for each clock cycle whilst the active transaction count circuitry indicates that there is at least one transaction in progress, the accumulator circuitry is configured to increase the priority level control value.

6. A data processing apparatus as claimed in claim 1, wherein the adaptive priority circuitry is provided with a target throughput indication indicative of said specified target throughput, and each time said predetermined point is detected, the accumulator circuitry is configured to decrease the priority level control value by an amount dependent on said target throughput indication, wherein:
    the target throughput indication provides an indication of a target average latency per transaction;
    during each clock cycle, whilst the active transaction count circuitry indicates that there is at least one transaction in progress, the accumulator circuitry is configured to increase the priority level control value by an amount dependent on the number of transactions that are in progress as indicated by the active transaction count circuitry; and
    each time said predetermined point is detected, the accumulator circuitry is configured to decrease the priority level control value by an amount dependent on said target average latency per transaction indication.

7. A data processing apparatus as claimed in claim 1, wherein the adaptive priority circuitry is provided with a target throughput indication indicative of said specified target throughput, and each time said predetermined point is detected, the accumulator circuitry is configured to decrease the priority level control value by an amount dependent on said target throughput indication, wherein:

the target throughput indication provides an indication of a target average latency between occurrences of said predetermined point;

each clock cycle whilst the active transaction count circuitry indicates that there is at least one transaction in progress, the accumulator circuitry is configured to increase the priority level control value by a fixed integer amount; and each time said predetermined point is detected, the accumulator circuitry is configured to decrease the priority level control value by an amount dependent on said target average latency between occurrences of said predetermined point.

8. A data processing apparatus as claimed in claim 1, wherein:

said throughput indication data comprises latency indication data indicative of a latency associated with said previously issued transactions, and said specified target throughput is a specified target latency.

9. A data processing apparatus as claimed in claim 8, wherein for each of said previously issued transactions the adaptive priority circuitry receives, as said latency indication data, first and second timing indications.

10. A data processing apparatus as claimed in claim 9, wherein said first timing indication is a transaction start indication, and said second timing indication is a transaction end indication.

11. A data processing apparatus as claimed in claim 10, wherein the adaptive priority circuitry comprises:

active transaction count circuitry configured to determine from the throughput indication data an indication of the number of transactions in progress; and accumulator circuitry configured to maintain a priority level control value, the accumulator circuitry increasing the priority level control value dependent on the indication of the number of transactions in progress, wherein said active transaction count circuitry uses the transaction start indication and the transaction end indication to maintain a record of the number of transactions that are in progress.

12. A data processing apparatus as claimed in claim 1, wherein the adaptive priority circuitry further comprises:

priority value determination circuitry configured, for each new transaction, to set the priority level for that transaction dependent on the priority level control value currently maintained by the accumulator circuitry.

13. A data processing apparatus as claimed in claim 12, wherein the priority value determination circuitry includes loop gain circuitry for controlling the extent to which changes in the priority level control value cause changes to the priority level set for each new transaction.

14. A data processing apparatus as claimed in claim 12, wherein:

if over time the monitored throughput indication data indicates that the throughput is exceeding the specified target throughput, the operation of the accumulator circuitry causes the priority level control value to be decremented below a value associated with the lowest priority level from amongst said plurality of predetermined priority levels, in order to cause the priority level control value to capture a measure of excess throughput observed by the associated source; and the priority value determination circuitry includes saturation circuitry to ensure in such instances that the priority level is set to the lowest priority level amongst said plurality of predetermined priority levels.

15. A data processing apparatus as claimed in claim 1, wherein:

the associated source performs discrete blocks of processing, each block of processing needing to complete within a specified time; and the adaptive priority circuitry is provided with a target throughput indication indicative of said specified target throughput, the target throughput indication identifying an average target throughput per transaction which if achieved will enable each block of processing to be performed within the specified time.

16. A data processing apparatus as claimed in claim 15, wherein the associated source performs graphics processing operations, and each discrete block of processing relates to a frame of graphics data.

17. A data processing apparatus as claimed in claim 15, wherein the adaptive priority circuitry comprises:

active transaction count circuitry configured to determine from the throughput indication data an indication of the number of transactions in progress; and accumulator circuitry configured to maintain a priority level control value, the accumulator circuitry increasing the priority level control value dependent on the indication of the number of transactions in progress, wherein the accumulator circuitry is reset between each discrete block of processing.

18. A data processing apparatus as claimed in claim 1, wherein said at least one master device comprises a plurality of master devices, each master device providing at least one source of said transactions.

19. A data processing apparatus as claimed in claim 18, wherein at least one of said plurality of master devices is a batch processing device performing batch processing operations, and the adaptive priority circuitry is associated with said batch processing device.

20. A data processing apparatus as claimed in claim 19, wherein said batch processing device is a graphics processing unit, and a further master device of said plurality of master devices is a central processing unit, the central processing unit not having the adaptive priority circuitry associated therewith.

21. A data processing apparatus as claimed in claim 1, wherein the plurality of sources are formed by a plurality of processing threads executing on a single master device, and the adaptive priority circuitry is associated with at least one of said processing threads.

22. A data processing apparatus as claimed in claim 21, wherein the single master device is a graphics processing unit, and said plurality of processing threads comprise at least a vertex processing thread and a pixel processing thread.

23. A data processing apparatus as claimed in claim 1, wherein the plurality of sources are formed by different types of transactions executing on the at least one master device.

24. A data processing apparatus as claimed in claim 23, wherein said different types of transactions comprise write transactions and read transactions.

25. A data processing apparatus as claimed in claim 9, wherein conditions triggering said first and second timing indications are programmable.

26. A data processing apparatus as claimed in claim 3, wherein the target throughput indication is programmable.

27. A data processing apparatus as claimed in claim 1, wherein the shared resource is a memory controller.

28. A data processing apparatus as claimed in claim 1, wherein multiple instances of said arbitration circuitry are provided within the data processing apparatus.

29. A data processing apparatus as claimed in claim 28, wherein one instance of said arbitration circuitry is provided within said shared resource.

30. Adaptive priority circuitry for use in association with a source of transactions in a data processing apparatus as claimed in claim 1, the adaptive priority circuitry configured to monitor throughput indication data for previously issued transactions from the associated source, and, for each new transaction from the associated source, to set an associated priority level for that transaction to one of a plurality of predetermined priority levels dependent on said throughput indication data, so as to set the lowest priority level from amongst said plurality of predetermined priority levels that will enable a specified target throughput to be achieved.

31. A method of setting priority levels for transactions within a data processing apparatus, the data processing apparatus comprising a shared resource for processing transactions, at least one master device for issuing said transactions to said shared resource, the at least one master device providing a plurality of sources of said transactions, and each of said transactions having a priority level associated therewith, and arbitration circuitry configured to apply an arbitration policy to select a transaction from amongst multiple transactions issued to said shared resource, the arbitration policy using the priority level associated with each of said multiple transactions when performing the selection, the method comprising, for at least one of said plurality of sources, the steps of:

monitoring throughput indication data for previously issued transactions from that source;

determining from the throughput indication data an indication of the number of transactions in progress;

maintaining a priority level control value, wherein the priority level control value is increased dependent on the indication of the number of transactions in progress;

detecting from the throughput indication data when a transaction in progress has reached a predetermined point, and responsive thereto, decreasing the priority level control value; and for each new transaction from that source, setting the priority level to one of a plurality of predetermined priority levels dependent on said throughput indication data, so as to set the lowest priority level from amongst said plurality of predetermined priority levels that will enable a specified target throughput to be achieved.

32. A data processing apparatus comprising:

shared resource means for processing transactions;

at least one master means for issuing said transactions to said shared resource means, the at least one master means for providing a plurality of sources of said transactions, and each of said transactions having a priority level associated therewith;

arbitration means for applying an arbitration policy to select a transaction from amongst multiple transactions issued to said shared resource means, the arbitration policy using the priority level associated with each of said multiple transactions when performing the selection; and adaptive priority means associated with at least one of said plurality of sources, the adaptive priority means for monitoring throughput indication data for previously issued transactions from the associated source, and for each new transaction from the associated source, the adaptive priority means for setting the priority level to one of a plurality of predetermined priority levels dependent on said throughput indication data, so as to set the lowest priority level from amongst said plurality of predetermined priority levels that will enable a specified target throughput to be achieved wherein the adaptive priority means comprises:

active transaction count means for determining from the throughput indication data an indication of the number of transactions in progress; and accumulator means for maintaining a priority level control value, the accumulator means increasing the priority level control value dependent on the indication of the number of transactions in progress, wherein the adaptive priority means is arranged to detect from the throughput indication data when a transaction in progress has reached a predetermined point, and responsive thereto the accumulator means is arranged to decrease the priority level control value.

\* \* \* \* \*